United States Patent
Kim et al.

(10) Patent No.: US 12,479,722 B2
(45) Date of Patent: Nov. 25, 2025

(54) DEHYDROGENATION REACTION DEVICE AND SYSTEM HAVING THE SAME

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Yongwoo Kim, Gunpo-si (KR); Jin Woo Choung, Suwon-si (KR); Jihui Seo, Ulsan (KR); Jaeyong Lee, Seongnam-si (KR); Pyung Soon Kim, Suwon-si (KR); Minkyu Kim, Seoul (KR); Yoondo Kim, Seoul (KR); Yu-Jin Lee, Seoul (KR); Jaewon Kirk, Seoul (KR); Suk Woo Nam, Seoul (KR); Yongmin Kim, Seoul (KR); Hyangsoo Jeong, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 718 days.

(21) Appl. No.: 17/863,997

(22) Filed: Jul. 13, 2022

(65) Prior Publication Data
US 2023/0183061 A1 Jun. 15, 2023

(30) Foreign Application Priority Data
Dec. 14, 2021 (KR) .................... 10-2021-0178212

(51) Int. Cl.
*C01B 3/06* (2006.01)

(52) U.S. Cl.
CPC ........ *C01B 3/065* (2013.01); *C01B 2203/066* (2013.01); *C01B 2203/1623* (2013.01); *C01B 2203/84* (2013.01)

(58) Field of Classification Search
CPC .............. C01B 3/065; C01B 2203/066; C01B 2203/1623; C01B 2203/84; C01B 3/04; C01B 3/02; Y02E 60/36; Y02E 60/50; B01J 8/0278; B01J 8/0285; H01M 8/065
See application file for complete search history.

(56) References Cited

FOREIGN PATENT DOCUMENTS

JP     2006185895 A   *  7/2006

OTHER PUBLICATIONS

Translation of JP 2006185895 A (Year: 2006).*
Soon-Mo Kwon et al., Development of a high-storage-density hydrogen generator using solid-state NaBH4 as a hydrogen source for unmanned aerial vehicles, Applied Energy; vol. 251, Oct. 1, 2019, https://doi.org/10.1016/j.apenergy.2019.113331; 9 pp.

* cited by examiner

*Primary Examiner* — Stuart L Hendrickson
*Assistant Examiner* — Joshua Maxwell Speer
(74) *Attorney, Agent, or Firm* — Lempia Summerfield Katz LLC

(57) ABSTRACT

A dehydrogenation reaction device includes: an acid aqueous solution storage unit including a first aqueous acid solution; a water storage unit including water; and a dehydrogenation reaction unit including a chemical hydride. The dehydrogenation reaction unit receives a second aqueous acid solution in which the first aqueous acid solution and water are mixed, and further reacts the chemical hydride and the second aqueous acid solution to generate hydrogen.

18 Claims, 6 Drawing Sheets

DEHYDROGENATION REACTION DEVICE AND SYSTEM HAVING THE SAME

CROSS-REFERENCE TO RELATED APPLICATION

This application claims priority to and the benefit of Korean Patent Application No. 10-2021-0178212, filed in the Korean Intellectual Property Office on Dec. 14, 2021, the entire contents of which are incorporated herein by reference.

BACKGROUND

(a) Field

The present disclosure relates to a dehydrogenation reaction device and a dehydrogenation reaction system including the same for supplying hydrogen to a fuel cell.

(b) Description of the Related Art

The statements in this section merely provide background information related to the present disclosure and may not constitute prior art.

Due to depletion of fossil energy and environmental pollution problems, renewable and alternative energy such as hydrogen is getting more attention.

A fuel cell and a hydrogen combustion device use hydrogen as a reaction gas, and a stable and continuous supply technology of hydrogen is required in order to use the fuel cell and the hydrogen combustion device to operate vehicles and various electronic products.

For example, in order to supply hydrogen to the hydrogen device, a method of receiving hydrogen whenever hydrogen is needed from a separately installed hydrogen supply source may be used. In this way, compressed hydrogen or liquid hydrogen may be used.

Alternatively, a method of generating hydrogen through a reaction of a corresponding material after mounting a material in which hydrogen is stored on a device using hydrogen and supplying it to the device using hydrogen may be used. For this method, for example, a method of dissolving a solid hydride in an aqueous solution, a method of using adsorption and desorption (absorbents/carbon), a chemical method (chemical hydrogen storage), and the like have been proposed.

However, in the case of the method of dissolving a solid hydride in a liquid phase, since the hydride is diluted and used with a low concentration to maintain the liquid state even after a hydrolysis reaction of the hydride is completed, a volume of the storage tank is large and a separate recovery tank is also required.

In addition, a separate gas-liquid separator is required because excess moisture is contained in the hydrogen gas after the reaction. This increases the volume and weight of the system as a whole and decreases the hydrogen storage capacity.

SUMMARY

The present disclosure provides a dehydrogenation reaction device that separates reactants of acid and water and stores them as an acid aqueous solution within a specific concentration range and water to improve a driving temperature range of a system. In addition, the dehydrogenation reaction device supplies the acid aqueous solution and the water to each individual pump and thus continuously regulates reaction conditions according to reaction time to control dynamic reaction conditions of the system.

Another embodiment of the present disclosure provides a dehydrogenation reaction system that separately recovers water generated in a fuel cell and then, stores and reuses it, thereby increasing hydrogen storage capacity.

According to an embodiment of the present disclosure, the dehydrogenation reaction device includes: an acid aqueous solution storage unit including the first aqueous acid solution; a water storage unit including water; and a dehydrogenation reaction unit that includes a chemical hydride and receives a second aqueous acid solution in which the first aqueous acid solution and water are mixed. In the dehydrogenation reaction unit, the chemical hydride reacts with the second aqueous acid solution and hydrogen is generated.

The chemical hydride may be charged into the dehydrogenation reaction unit in a solid state.

The chemical hydride may include sodium borohydride ($NaBH_4$), lithium borohydride ($LiBH_4$), potassium borohydride ($KBH_4$), ammonium borohydride ($NH_4BH_4$), ammonia borane ($NH_3BH_3$), tetramethyl ammonium borohydride (($CH_3)_4NH_4BH_4$), sodium aluminum hydride ($NaAlH_4$), lithium aluminum hydride ($LiAlH_4$), potassium aluminum hydride ($KAlH_4$), calcium diborohydride ($Ca(BH_4)_2$), magnesium diborohydride ($Mg(BH_4)_2$), sodium gallium hydride ($NaGaH_4$), lithium gallium hydride ($LiGaH_4$), potassium gallium hydride ($KGaH_4$), lithium hydride ($LiH$), calcium hydride ($CaH_2$), magnesium hydride ($MgH_2$), or a mixture thereof.

The first aqueous acid solution may be sulfuric acid, nitric acid, phosphoric acid, hydrochloric acid, boric acid, a heteropoly acid, acetic acid, formic acid, malic acid, citric acid, tartaric acid, ascorbic acid, lactic acid, oxalic acid, succinic acid, tauric acid, or a mixture thereof.

In the dehydrogenation reaction unit, the second aqueous acid solution may react in a mole ratio of about 0.25 to about 1 based on 1 mole of the chemical hydride.

In the dehydrogenation reaction unit, water may react in a mole ratio of about 2 to about 4 based on 1 mole of the chemical hydride.

In the dehydrogenation reaction unit, a temperature of the reacting may be about 10° C. to about 400° C., and a pressure of the reacting may be about 1 bar to about 100 bar.

In the acid aqueous solution storage unit, an acid concentration of the first aqueous acid solution may be about 12 mol % to about 70 mol %.

An acid concentration of the second aqueous acid solution may be about 5.88 mol % to about 33.3 mol %.

The dehydrogenation reaction device may include a first pump for supplying the first aqueous acid solution to the dehydrogenation reaction unit.

The dehydrogenation reaction device may include a second pump for supplying water to the dehydrogenation reaction unit.

The dehydrogenation reaction device may adjust an acid concentration or a supply flow rate of the second aqueous acid solution by the first pump and the second pump.

According to another embodiment, a dehydrogenation reaction system includes: an acid aqueous solution storage unit including the first aqueous acid solution; a water storage unit including water; a dehydrogenation reaction unit including a chemical hydride. In particular, the dehydrogenation reaction unit receives a second aqueous acid solution in which the first aqueous acid solution and water are mixed, and reacts the chemical hydride and the second aqueous acid solution to generate hydrogen. The dehydrogenation reaction system further includes a fuel cell that receives hydrogen generated from the dehydrogenation reaction unit and performs a reaction between hydrogen and oxygen to produce water and generate electrical energy.

The water storage unit may recover and store water generated in the fuel cell.

The dehydrogenation reaction system may further include a thermal management unit for managing heat generated in the fuel cell, the dehydrogenation reaction unit, or a combination thereof.

The thermal management unit may transfer heat generated from the fuel cell to the water storage unit.

The thermal management unit may transfer heat generated in the dehydrogenation reaction unit to the water storage unit or the fuel cell.

The dehydrogenation reaction system may further include a hydrogen storage unit for receiving and storing hydrogen from the dehydrogenation reaction unit.

The dehydrogenation reaction system may further include a back pressure regulator between the dehydrogenation reaction unit and the hydrogen storage unit.

The dehydrogenation reaction system may further include a mass flow controller between the hydrogen storage unit and the fuel cell.

The dehydrogenation reaction device according to an embodiment may separate acid and water of reactants and store them as an acid aqueous solution within a specific concentration range and water and thus improve a driving temperature range of the system to a very wide range. In addition, the dehydrogenation reaction device may supply the acid aqueous solution and the water to each individual pump and continuously control reaction conditions according to reaction time and thus regulate dynamic reaction conditions of the system.

The dehydrogenation reaction system according to another embodiment may separately collect and store water generated from a fuel cell and then, reuse it and thus increase hydrogen storage capacity.

BRIEF DESCRIPTION OF THE DRAWINGS

In order that the disclosure may be well understood, there will now be described various forms thereof, given by way of example, reference being made to the accompanying drawings, in which.

Figure 1:
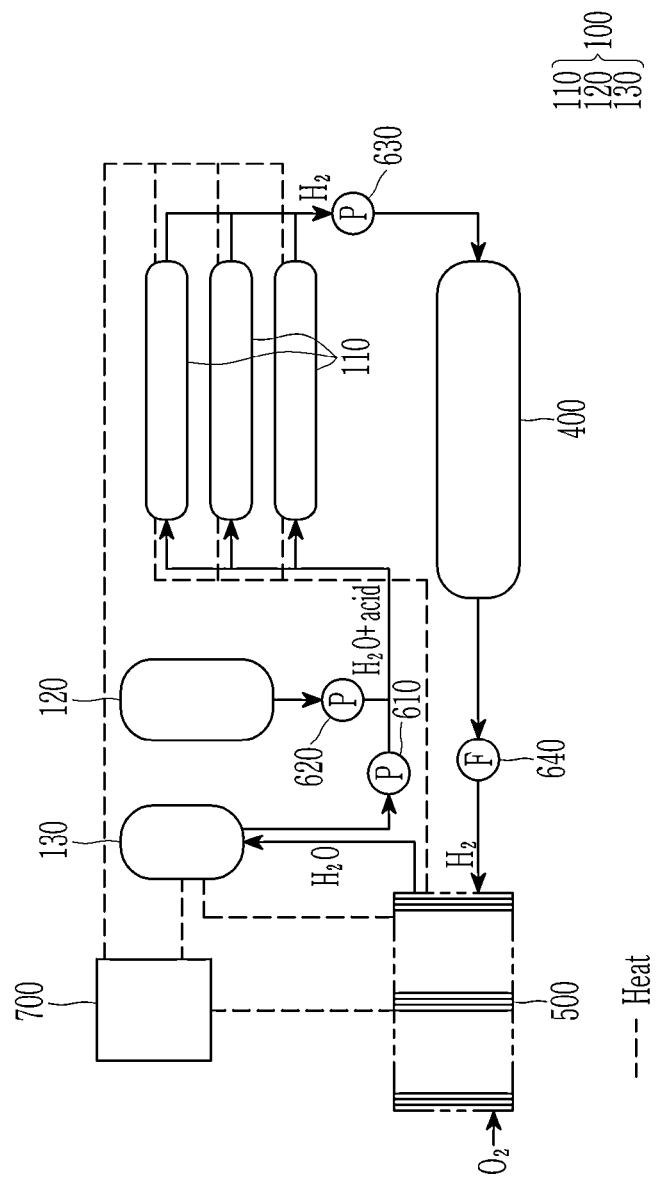
FIG. 1 is a schematic view showing a dehydrogenation reaction system according to an embodiment.

The drawings described herein are for illustration purposes only and are not intended to limit the scope of the present disclosure in any way.

DETAILED DESCRIPTION

The advantages, features, and aspects to be described hereinafter should become apparent from the following description of the embodiments with reference to the accompanying drawings, which is set forth hereinafter. However, the present disclosure may be not limited to embodiments that are described herein. Although not specifically defined, all of the terms including the technical and scientific terms used herein have meanings understood by persons having ordinary skill in the art. The terms have specific meanings coinciding with related technical references and the present specification as well as lexical meanings. In other words, the terms are not to be construed as having idealized or formal meanings. Throughout the specification and claims which follow, unless explicitly described to the contrary, the word "comprise/include" or variations such as "comprises/includes" or "comprising/including" should be understood to imply the inclusion of stated elements but not the exclusion or any other elements.

The terms of a singular form may include plural forms unless referred to the contrary.

In the drawings, the thickness of layers, films, panels, regions, etc., are exaggerated for clarity. Like reference numerals designate like elements throughout the present disclosure.

It should be understood that when an element such as a layer, film, region, or substrate is referred to as being "on" another element, it can be directly on the other element or intervening elements may also be present. In contrast, when an element is referred to as being "directly on" another element, there are no intervening elements present.

When a component, device, element, or the like of the present disclosure is described as having a purpose or performing an operation, function, or the like, the component, device, or element should be considered herein as being "configured to" meet that purpose or to perform that operation or function.

FIG. 1 is a schematic view showing a dehydrogenation reaction system according to an embodiment. Hereinafter, the dehydrogenation reaction device and the dehydrogenation reaction system are described in detail with reference to FIG. 1.

Referring to FIG. 1, the dehydrogenation reaction device 100 includes a dehydrogenation reaction unit 110, an acid aqueous solution storage unit 120, and a water storage unit 130.

The dehydrogenation reaction unit 110 includes a chemical hydride.

For example, the chemical hydride may be charged into the dehydrogenation reaction unit 110 in a solid state.

For example, the chemical hydride in the solid state may be in the form of any one of powder, granular, beads, microcapsule, and pellets. When chemical hydride is stored in an aqueous solution state (a concentration of chemical hydride: about 20%), a large amount of chemical hydride cannot be stored, but when chemical hydride is stored in a solid state, large-capacity storage may be possible.

The chemical hydride may be any compound that is hydrolyzed to produce hydrogen and a hydrolysate, for example, $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or a mixture thereof.

The dehydrogenation reaction unit 110 may be configured as a high-temperature and high-pressure vessel so that the dehydrogenation reaction may be performed under high-temperature and high-pressure conditions. For example, the dehydrogenation reaction unit 110 may have a shape such as a cylinder, a sphere, a cuboid, or a polygonal column, and particularly may have a cylinder shape.

The dehydrogenation reaction unit 110 may be a cartridge-type dehydrogenation reaction unit so that the dehydrogenation reaction unit 110 can be replaced; an upper portion may be designed to be opened and closed so that chemical hydride may be injected or replaced; or a product may be discharged and chemical hydride may be introduced through the lower portion, thereby ensuring system continuity. Additionally, the dehydrogenation reaction unit 110 may further include a portion for discharging the slurried hydrolysis reaction product, and a portion for injecting a chemical hydride.

The dehydrogenation reaction unit 110 may include a heating device (not shown) that provides heat/temperature necessary for hydrolysis of chemical hydride or a separate purpose, or a cooling device (not shown) for discharging reaction heat when the hydrogen generation reaction is an exothermic reaction. For example, the heating device may use electricity or other heat sources, and the cooling device may be implemented as a refrigerant circulation device to discharge heat generated by the hydrolysis of the chemical hydride.

The acid aqueous solution storage unit 120 stores the first aqueous acid solution.

The first aqueous acid solution may be an inorganic acid such as sulfuric acid, nitric acid, phosphoric acid, boric acid, or hydrochloric acid, an organic acid such as heteropoly acid, acetic acid, formic acid, malic acid, citric acid, tartaric acid, ascorbic acid, lactic acid, oxalic acid, succinic acid, tauric acid, or a mixture thereof. Because the molecular weight is small compared to proton, and the system weight may be reduced and formic acid (HCOOH) may be used as it is safer than hydrochloric acid in a high concentration state. In the case of formic acid, as a weak acid, the pH is maintained at about 2 under the conditions described in the present disclosure, so it may be used relatively safely. In addition, captured carbon dioxide may be obtained through hydrogenation, so it is an important material in terms of a recycling/recycling of carbon dioxide. In addition, formate is converted to bicarbonate through a dehydrogenation reaction, whereby additional hydrogen may be obtained.

The acid aqueous solution storage unit 120 may have a corrosion-resistant protective layer such as Teflon coating to prevent corrosion by the first aqueous acid solution.

In the dehydrogenation reaction unit 110, a dehydrogenation reaction in which hydrogen is generated by a hydrolysis reaction of a chemical hydride by the second aqueous acid solution proceeds. Here, the second aqueous acid solution is a mixture of the first aqueous acid solution and water, as described below, and an acid concentration of the second aqueous acid solution and the first aqueous acid solution may be different. The second aqueous acid solution adjusts the pH of the chemical hydride so that the dehydrogenation reaction may be promoted.

For example, when the chemical hydride is $NaBH_4$ and the acid is HCOOH, the dehydrogenation reaction as shown in Reaction Formula 1 occurs.

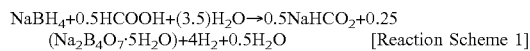

$NaBH_4 + 0.5HCOOH + (3.5)H_2O \rightarrow 0.5NaHCO_2 + 0.25(Na_2B_4O_7 \cdot 5H_2O) + 4H_2 + 0.5H_2O$ [Reaction Scheme 1]

In the dehydrogenation reaction unit 110, the second acid solution may react in a mole ratio of about 0.25 to about 1 based on 1 mole of the chemical hydride, and water may react in a mole ratio of 2 to 4 based on 1 mole of the chemical hydride. When the mole ratio of the acid is less than about 0.25 or the mole ratio of water is less than about 2, the conversion rate may decrease, and when the mole ratio of the acid exceeds about 1 or the mole ratio of the water exceeds about 4, the hydrogen storage capacity may decrease.

When the second acid aqueous solution is used to generate hydrogen from the chemical hydride, water is easily vaporized due to an exothermic reaction (a water vaporization temperature: 100° C. at 1 bar), so that the amount of generated hydrogen (i.e., a hydrogen storage capacity) may be deteriorated.

Therefore, the dehydrogenation reaction may take place under high-temperature and high-pressure conditions. This prevents vaporization of water and reduces the amount of the used water, thereby increasing or maximizing the amount of generated hydrogen (the water vaporization temperature: 175° C. at 10 bar, 260° C. at 50 bar). In addition, the generation of $CO_2$ may also be suppressed through the pressurization operation of the dehydrogenation reaction unit 110.

Also, if excess water is included in a hydrogen gas after the reaction, a separate gas-liquid separator is desired, and accordingly the volume and weight of the entire system may be increased and then the hydrogen storage capacity may be decreased. However, high-temperature and high-pressure operation of the dehydrogenation reaction unit 110 may increase the hydrogen storage capacity and reduce the system cost and weight.

For example, in the case of the system using $NaBH_4$ and formic acid (HCOOH), the temperature of the dehydrogenation reaction may be about 10° C. to about 400° C., or about 100° C. to about 250° C. When the temperature of the dehydrogenation reaction is less than about 10° C., the acid or second acid aqueous solution may be coagulated or separated, and when the temperature exceeds about 400° C., a side reaction such as an occurrence of carbon monoxide may increase.

The pressure of the dehydrogenation reaction may be about 1 bar to about 100 bar, or about 5 bar to about 50 bar. If the pressure of the dehydrogenation reaction is less than about 1 bar, a decompression pump is desired, which may unnecessarily increase the system weight, and if it exceeds about 100 bar, the weight and volume of a high-temperature/high-pressure reactor may increase.

Accordingly, the gas product generated in the dehydrogenation reaction unit 110 may contain about 99 volume % or more of hydrogen, about 1 volume % or less of water, and about 0.1 volume % or less of other impurities.

In the dehydrogenation reaction unit 110, because chemical hydride is reacted with acid and water included in the second acid aqueous solution in a predetermined ratio in order to maximize a hydrogen conversion rate, a freezing point depression effect may be sufficiently used in order to improve a driving temperature range of the system to a very wide range.

For example, a system using NaBH4 and formic acid (HCOOH) reacts the acid in a mole ratio of about 0.25 to about 1 and the water in a mole ratio of about 2 to about 4 relative to about 1 mole of the chemical hydride, the second acid aqueous solution used in the reaction may have an acid concentration of about 5.88 mol % to about 33.3 mol %. Herein, since the second acid aqueous solution has a freezing point of about −5° C. to about −35° C., considering that a driving temperature range of a vehicle is about −40° C. to about 120° C., when the second acid aqueous solution is stored at the acid concentration in the acid aqueous solution storage unit 120, there is a problem that the acid aqueous solution stored in the acid aqueous solution storage unit 120 is frozen within the driving temperature range of a vehicle.

Figure 2:
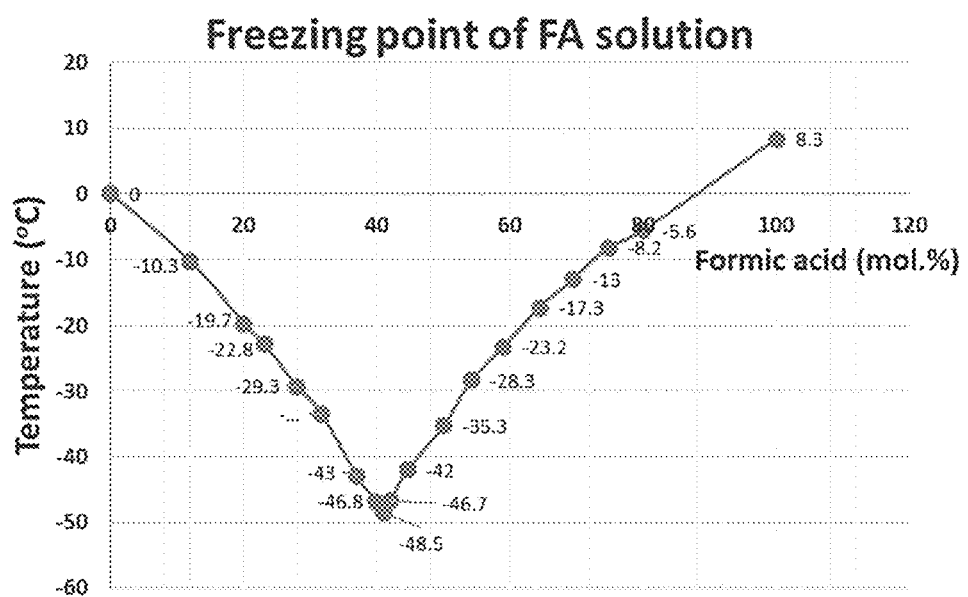
FIG. 2 is a graph showing a freezing point of formic acid (FA) aqueous solution according to the mole % of formic acid.

However, when the first acid aqueous solution stored in the acid aqueous solution storage unit 120 has an acid concentration of about 12 mol % to about 70 mol %, for example, about 36 mol % to about 46 mol %, because the first acid aqueous solution has a freezing point of less than or equal to about −40° C., the first acid aqueous solution may not be frozen within the driving temperature range of a vehicle. For example, FIG. 2 is a graph showing a freezing point of a formic acid (FA) aqueous solution according to mole % of formic acid. Referring to FIG. 2, when the formic acid aqueous solution has a formic acid concentration of about 12 mol % to about 70 mol %, for example, about 36 mol % to about 46 mol %, the formic acid aqueous solution may have a freezing point of less than or equal to about −40° C.

Accordingly, the dehydrogenation reaction device 100 may further include the acid aqueous solution storage unit 120 and the water storage unit 130 to store the first acid aqueous solution at an acid concentration so as to have a lower freezing point than the driving temperature range of a vehicle in the acid aqueous solution storage unit 120 and supply the first acid aqueous solution to the dehydrogenation reaction unit 110. The dehydrogenation reaction device 100 may mix the first acid aqueous solution in the acid aqueous solution storage unit 120 and water in the water storage unit 130 so that an acid concentration of the second acid aqueous solution may be adjusted into an appropriate acid concentration for a dehydrogenation reaction, thereby securing a system having a wide driving temperature range by using a freezing point depression phenomenon of the first acid aqueous solution For example, the acid concentration of the first acid aqueous solution stored in the acid aqueous solution storage unit 120 may be about 12 mol % to about 70 mol % or about 36 mol % to about 46 mol %. When the acid concentration of the first acid aqueous solution is about 36 mol % to about 46 mol %, the freezing point depression phenomenon may be used to lower the freezing point to less than about −40° C. and thus widen the temperature range of the system without an additional heat source.

For example, the acid concentration of the second acid aqueous solution in which the first acid aqueous solution supplied to the dehydrogenation reaction unit 110 is mixed with water may be about 5.88 mol % to about 33.3 mol %. When the acid concentration of the second acid aqueous solution is about 5.88 mol % to about 33.3 mol %, a reaction may be controlled at an optimal mole ratio, maximizing an amount of generated hydrogen.

In addition, the dehydrogenation reaction device 100 includes the water storage unit 130 and thus may increase hydrogen storage capacity (g/L) of the system. As described below, because the water stored in the water storage unit 130 is recovered from a fuel cell 500 and reused, the water storage unit 130 does not need to have the same volume as a total amount of water used in the dehydrogenation reaction.

Accordingly, the volumes of the stored first acid aqueous solution and water are reduced, and thus a volume of the entire system is reduced. This configuration increases hydrogen storage capacity (g/L) of the system.

Figure 3:
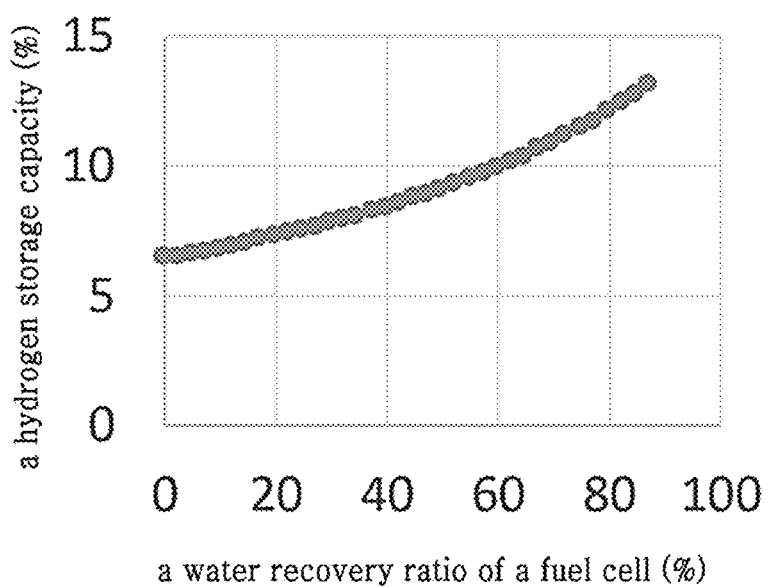
FIG. 3 is a graph showing a change in hydrogen storage capacity according to a water recovery ratio of the fuel cell ($NaBH_4:HCOOH:H_2O=1:0.5:3.5$)

For example, when $NaBH_4$, $HCOOH$, and $H_2O$ are reacted respectively by about 1 mol, about 0.5 mol, and about 3.5 mol, a volume reducing effect of the water storage unit 130 when water is reused and when the water is not reused are shown in FIG. 3. Herein, the water is assumed to be 350 $mol_{H2O}$, and the water storage unit 130 is assumed to have a volume of about 1 L.

Referring to FIG. 3, when water is not reused, about 6.3 L of water and about 1.89 L of formic acid are reacted and thus about 8.19 L of a volume is required. However, when the water is reused, since a volume of a formic acid aqueous solution (36 mol %) having a freezing point of about −40° C. is about 3.49 L, while a volume of water is about 1 L, which require about 4.48 L of a volume, there is a volume-reducing effect of about 45%, when a volume of a formic acid aqueous solution (about 41 mol %) having a freezing point of about −48.5° C. is about 3.18 L, while a volume of water is about 1 L, which require about 4.18 L of a volume, there is a volume-reducing effect of about 49%, when a volume of a formic acid an aqueous solution (about 46 mol %) having a freezing point of about −40° C. is about 2.94 L, while a volume of water is about 1 L, which require about 3.94 L of a volume, there is a volume-reducing effect of about 52%, when a volume of a formic acid aqueous solution (about 60 mol %) having a freezing point of about −23° C. is about 2.49 L, while a volume of water is about 1 L, which require about 3.49 L of a volume, there is a volume-reducing effect of about 57%, and when a volume of a formic acid aqueous solution (100 mol %) having a freezing point of about 8.3° C. is about 1.89 L, while a volume of water is about 1 L, which require about 2.89 L of a volume, there is a volume-reducing effect of about 65%.

Figure 4:
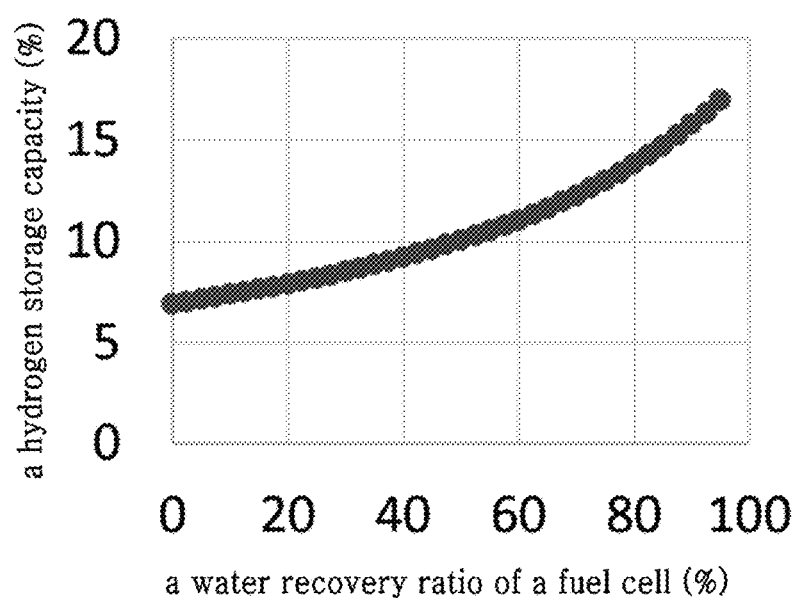
FIG. 4 is a graph showing a change in hydrogen storage capacity according to a water recovery ratio of the fuel cell ($NaBH_4:HCOOH:H_2O=1:0.2:3.8$)

In addition, when $NaBH_4$, $HCOOH$, and $H_2O$ are respectively reacted by about 1 mole, about 0.2 mole, and about 3.8 mole, each volume-reducing effect of the water storage unit 130 is calculated, and the results are shown in FIG. 4. Referring to FIG. 4, like FIG. 3, the volume-reducing effect may be obtained by adjusting a concentration of the first acid aqueous solution and reusing water.

The dehydrogenation reaction device 100 may include a first pump 610 between the acid aqueous solution storage unit 120 and the dehydrogenation reaction unit 110. The first pump 610 may supply the first acid aqueous solution from the acid aqueous solution storage unit 120 to the dehydrogenation reaction unit 110 and adjust a supply flow rate of the second acid aqueous solution. The first pump 610 may be located on a line connecting the acid aqueous solution storage unit 120 and the dehydrogenation reaction unit 110.

In addition, the dehydrogenation reaction device 100 may include a second pump 620 between the water storage unit 130 and the dehydrogenation reaction unit 110. The second pump 620 may supply water from the water storage unit 130 to the dehydrogenation reaction unit 110 and adjust a supply flow rate of the water. The second pump 620 may be located on a line connecting the water storage unit 130 and the dehydrogenation reaction unit 110.

The first line connecting the acid aqueous solution storage unit 120 with the dehydrogenation reaction unit 110 and the second line connecting the water storage unit 130 with the dehydrogenation reaction unit 110 respectively pass the first pump 610 and the second pump 620 and then may be combined together. Accordingly, the second acid aqueous solution in which the first acid aqueous solution and the water are mixed may be supplied to the dehydrogenation reaction unit 110. In addition, first pump 610 and second pump 620 respectively regulate each supply flow rate of the first acid aqueous solution and the water and thus an acid concentration or a supply flow rate of the second acid aqueous solution.

The first pump 610 and the second pump 620 may independently regulate each injection speed of the first acid aqueous solution and the water to control reactivity of the hydrogen generation reaction according to reaction time and thus dynamically control a reaction rate and a conversion rate.

Figure 5:
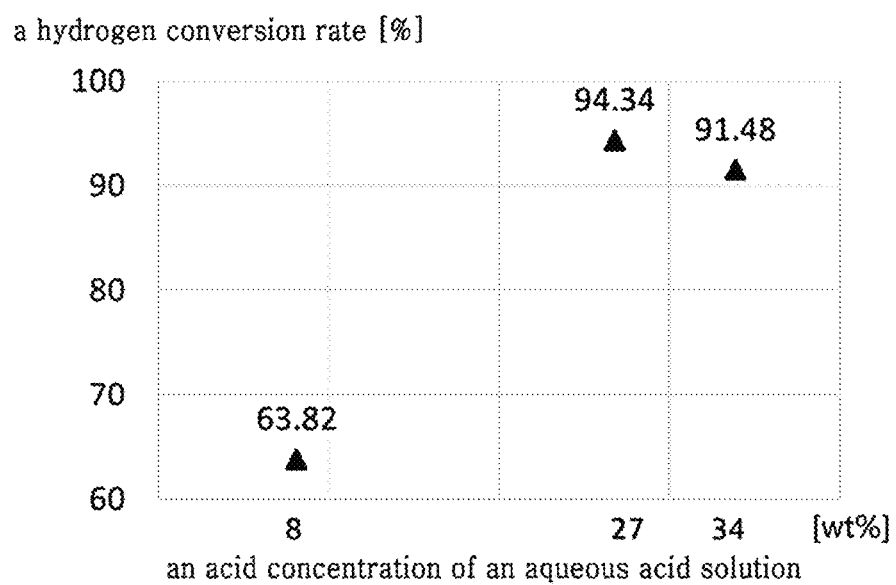
FIG. 5 is a graph showing a change in the hydrogen conversion rate according to a change in the acid concentration of the second aqueous acid solution.
Figure 6:
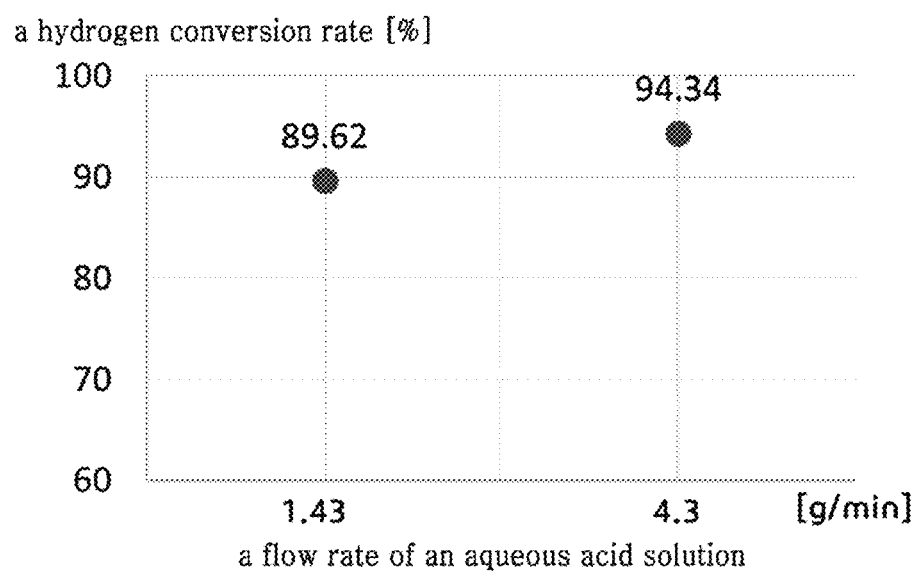
FIG. 6 is a graph showing a change in the hydrogen conversion rate according to a change in the flow rate of the second aqueous acid solution.

FIG. 5 is a graph showing a change in the hydrogen conversion rate according to a change in the acid concentration of the second aqueous acid solution and FIG. 6 is a graph showing a change in the hydrogen conversion rate according to a change in the flow rate of the second aqueous acid solution.

FIG. 5 shows that when an acid concentration of the formic acid aqueous solution is respectively changed into about 8 wt %, about 27 wt %, and about 34 wt %, a hydrogen conversion rate is changed into about 63.82%, about 94.34%, and about 91.48%, and FIG. 6 shows that when a flow rate of the formic acid aqueous solution (acid concentration: about 27 wt %) is respectively changed into about 1.43 g/min and about 4.3 g/min, the hydrogen conversion rate is changed into about 89.62% and about 94.34%.

Accordingly, through the first pump 610 and the second pump 620, a dehydrogenation reaction rate and a hydrogen conversion rate may be dynamically controlled by changing reaction conditions according to reaction time.

In this way, the dehydrogenation reaction device 100 may separately stores the first acid aqueous solution and the water and improve the driving temperature range of the system to a very wide range. In this way, a storage concentration of a reactant of the first acid aqueous solution may be controlled to secure a wider driving range through the freezing point depression (about −48.5° C.) phenomenon than a freezing point of 8.3° C. when acid alone is stored.

In addition, the dehydrogenation reaction device 100 supplies the first acid aqueous solution and the water to each pump to continuously regulate reaction conditions according to reaction time and thus control dynamic reaction conditions of the system. In other words, the first acid aqueous solution and the water are injected into each pump to continuously control reaction conditions according to reaction time, and water generated from the fuel cell 500 may be collected and stored and then, reused, increasing hydrogen storage capacity of the system.

Referring to FIG. 1, the dehydrogenation reaction system includes a dehydrogenation reaction device 100 and a fuel cell 500, and may further optionally include a hydrogen storage unit 400.

Since the dehydrogenation reaction device 100 is the same as described above, a repetitive description is omitted.

The dehydrogenation reaction unit 110 may increase the hydrogen storage capacity by arranging several reactors in parallel as needed.

Hydrogen produced in the dehydrogenation reaction unit 110 is transferred to the hydrogen storage unit 400. The hydrogen storage unit 400 receives and stores a predetermined amount of hydrogen gas. For example, the hydrogen storage unit 400 may be a buffer tank.

If necessary, the dehydrogenation reaction system may further include a back pressure regulator 630 between the dehydrogenation reaction unit 110 and the hydrogen storage unit 400, and may further include a mass flow controller 640 between the hydrogen storage unit 400 and the fuel cell 500.

In addition, the dehydrogenation reaction unit 110 may further include a sensor, a thermometer, or a pressure gauge inside or outside. Thereby, hydrogen gas may be stored in the hydrogen storage unit 400 at a constant pressure, and hydrogen gas may be supplied to the fuel cell 500 at a desired pressure and mass.

The fuel cell 500 is located downstream of the hydrogen storage unit 400 and receives hydrogen gas from the hydrogen storage unit 400.

The fuel cell 500 generates water by reacting the supplied hydrogen with oxygen and simultaneously generates electrical energy. The water produced in the fuel cell 500 is discharged through exhaust means such as valves.

Alternatively, the water generated in the fuel cell 500 may be recovered and stored in the water storage unit 130. In this case, the amount of water supplied to the water storage unit 130 may be adjusted by valves (not shown). Through this, because only a small tank capable of storing water is required, the volume and weight may be reduced to increase the hydrogen storage capacity of the dehydrogenation reaction system.

The fuel cell 500 may be any device that converts the hydrogen gas into usable electrical energy, and for example, it may be a proton exchange membrane fuel cell (PEMFC), an alkaline fuel cell (AFC), a phosphoric acid fuel cell (PAFC), a molten carbonate salt fuel cell (MCFC), or a solid oxide fuel cell (SOFC), etc., but the present disclosure is not limited thereto.

For example, the fuel cell 500 may pass the generated electrical energy through a power converter such as a DC converter, an inverter, or a charge controller. The power converter may output a portion of the electrical energy to an electrical load through a load interconnect, and the other portion of the electrical energy may be sent back to the energy storage through a recharging interconnect. Another portion of the electrical energy may be used to supply power to a control unit.

In another embodiment, the dehydrogenation reaction system may further include a thermal management unit 700 for managing heat generated from the fuel cell 500, the dehydrogenation reaction unit 110, or a combination thereof. For example, the thermal management unit 700 may transfer waste heat (about 80° C.) generated from the fuel cell 500 to the water storage unit 130 and efficiently prevent water from being frozen or melting frozen water even at a low temperature to inject a required amount of water into a reactor without delay.

In addition, the thermal management unit 700 may transfer the heat generated in the dehydrogenation reaction unit 110 to the water storage unit 130 or to the fuel cell 500 to improve an initial driving speed.

In another embodiment, the dehydrogenation reaction system may include an outlet for exhausting the mixture of the chemical hydride, the acid, and the water after the reaction has been completed, and may include a device for removing reaction by-products other than hydrogen and the water or converting it to other materials.

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the present disclosure.

DESCRIPTION OF SYMBOLS

100: dehydrogenation reaction device
110: dehydrogenation reaction unit
120: acid aqueous solution storage unit
130: water storage unit
400: hydrogen storage unit
500: fuel cell 610: first pump
620: second pump
630: back pressure regulator
640: mass flow controller
700: thermal management unit

What is claimed is:

1. A dehydrogenation reaction device, comprising:
an acid aqueous solution storage unit including a first aqueous acid solution,
a water storage unit including water, and
a dehydrogenation reaction unit including a chemical hydride and configured to receive a second aqueous acid solution in which the first aqueous acid solution and water are mixed,
wherein the chemical hydride reacts with the second aqueous acid solution in the dehydrogenation reaction unit to generate hydrogen, and
wherein
in the acid aqueous solution storage unit, an acid concentration of the first aqueous acid solution is about 12 mol % to about 70 mol %.

2. The dehydrogenation reaction device of claim 1, wherein the chemical hydride is charged into the dehydrogenation reaction unit in a solid state.

3. The dehydrogenation reaction device of claim 1, wherein
the chemical hydride includes $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or a mixture thereof.

4. The dehydrogenation reaction device of claim 1, wherein
the first aqueous acid solution is sulfuric acid, nitric acid, phosphoric acid, hydrochloric acid, boric acid, a heteropoly acid, acetic acid, formic acid, malic acid, citric acid, tartaric acid, ascorbic acid, lactic acid, oxalic acid, succinic acid, tauric acid, or a mixture thereof.

5. The dehydrogenation reaction device of claim 1, wherein
in the dehydrogenation reaction unit, the second aqueous acid solution reacts in a mole ratio of about 0.25 to about 1 based on 1 mole of the chemical hydride.

6. The dehydrogenation reaction device of claim 1, wherein
in the dehydrogenation reaction unit, water reacts in a mole ratio of about 2 to about 4 based on 1 mole of the chemical hydride.

7. The dehydrogenation reaction device of claim 1, wherein
in the dehydrogenation reaction unit, a temperature of the reacting is about 10° C. to about 400° C., and a pressure of the reacting is about 1 bar to about 100 bar.

8. The dehydrogenation reaction device of claim 1, wherein an acid concentration of the second aqueous acid solution is about 5.88 mol % to about 33.3 mol %.

9. The dehydrogenation reaction device of claim 1, wherein
the dehydrogenation reaction device includes:
a first pump configured to supply the first aqueous acid solution to the dehydrogenation reaction unit, and
a second pump configured to supply water to the dehydrogenation reaction unit.

10. The dehydrogenation reaction device of claim 9, wherein
the dehydrogenation reaction device is configured to adjust an acid concentration or a supply flow rate of the second aqueous acid solution by the first pump and the second pump.

11. A dehydrogenation reaction system, comprising:
an acid aqueous solution storage unit including a first aqueous acid solution,
a water storage unit including water,
a dehydrogenation reaction unit including a chemical hydride and configured to:
receive a second aqueous acid solution in which the first aqueous acid solution and water are mixed, and
react the chemical hydride and the second aqueous acid solution to generate hydrogen, and
a fuel cell configured to receive hydrogen generated from the dehydrogenation reaction unit and perform a reaction between hydrogen and oxygen to produce water and generate electrical energy,
wherein
in the acid aqueous solution storage unit, an acid concentration of the first aqueous acid solution is about 12 mol % to about 70 mol %.

12. The dehydrogenation reaction system of claim 11, wherein
the water storage unit is configured to recover and store the water generated in the fuel cell.

13. The dehydrogenation reaction system of claim 11, wherein
the dehydrogenation reaction system further includes a thermal management unit configured to manage heat generated in the fuel cell, the dehydrogenation reaction unit, or a combination thereof.

14. The dehydrogenation reaction system of claim 13, wherein
the thermal management unit is configured to transfer the heat generated from the fuel cell to the water storage unit.

15. The dehydrogenation reaction system of claim 13, wherein
the thermal management unit is configured to transfer the heat generated in the dehydrogenation reaction unit to the water storage unit or the fuel cell.

16. The dehydrogenation reaction system of claim 11, wherein
the dehydrogenation reaction system further includes a hydrogen storage unit configured to receive and store hydrogen from the dehydrogenation reaction unit.

17. The dehydrogenation reaction system of claim 16, wherein
the dehydrogenation reaction system further includes a back pressure regulator between the dehydrogenation reaction unit and the hydrogen storage unit.

18. The dehydrogenation reaction system of claim 16, wherein
the dehydrogenation reaction system further includes a mass flow controller between the hydrogen storage unit and the fuel cell.

\* \* \* \* \*